United States Patent
Balasubramanian et al.

(10) Patent No.: US 10,460,019 B2
(45) Date of Patent: Oct. 29, 2019

(54) COMPUTER IMPLEMENTED SYSTEM AND METHOD FOR TRANSFORMING WEB CONTENT FOR DISPLAY ON MULTIPLE FORM FACTORS

(71) Applicant: NORTH AMERICA PHOTON INFOTECH LIMITED, Cybercity (MU)

(72) Inventors: Mukund Balasubramanian, Chennai (IN); Muhamad Daud, Dallas, TX (US)

(73) Assignee: NORTH AMERICA PHOTON INFOTECH LIMITED, Cybercity (MU)

(*) Notice: Subject to any disclaimer, the term of this patent is extended or adjusted under 35 U.S.C. 154(b) by 0 days.

(21) Appl. No.: 15/715,644

(22) Filed: Sep. 26, 2017

(65) Prior Publication Data
US 2018/0089154 A1    Mar. 29, 2018

Related U.S. Application Data

(60) Provisional application No. 62/399,488, filed on Sep. 26, 2016.

(51) Int. Cl.
*H03M 7/30* (2006.01)
*G06F 17/22* (2006.01)
(Continued)

(52) U.S. Cl.
CPC ...... *G06F 17/2264* (2013.01); *G06F 11/3684* (2013.01); *G06F 16/9577* (2019.01);
(Continued)

(58) Field of Classification Search
CPC ............ G06F 17/2264; G06F 11/3684; G06F 17/218; G06F 17/2247; G06F 17/228
(Continued)

(56) References Cited

U.S. PATENT DOCUMENTS 8,762,556 B2* 6/2014 Priyadarshan ...... G06F 17/2247
                                                        709/219
8,819,630 B2* 8/2014 Chen ................. G06F 17/30905
                                                        717/124

(Continued)

*Primary Examiner* — Cesar B Paula
*Assistant Examiner* — Luu-Phuong T Nguyen
(74) *Attorney, Agent, or Firm* — Barry Choobin; Patent 360 LLC

(57) ABSTRACT

The present disclosure envisages a system that incorporates built-in semantic tagging capabilities. The system auto generates test cases based on semantic tags. The system envisaged by the present disclosure personalizes a web page (particular web content) for different users, based on the personalization criteria specified by each of the users. The system further transforms a desktop based website into a mobile form factor and vice-versa with minimal quantum of software programming. The system incorporates data driven test cases and eliminates manual scripting of test cases, by the way of providing JSON (Java Script Object Notation) data as an input point for a test. The system enables users to extend their presence beyond desktop applications, and onto other channels such as native mobile applications, by seamlessly transforming the web content from one form factor (current form factor) to another appropriate form factor (secondary form factor).

6 Claims, 1 Drawing Sheet

(51) Int. Cl.
*G06F 11/36* (2006.01)
*G06F 17/21* (2006.01)
*G06F 16/957* (2019.01)
*G06F 17/27* (2006.01)

(52) U.S. Cl.
CPC ........ *G06F 17/218* (2013.01); *G06F 17/2247* (2013.01); *G06F 17/2288* (2013.01); *G06F 17/2785* (2013.01)

(58) Field of Classification Search
USPC ........................................................ 715/229
See application file for complete search history.

(56) References Cited

U.S. PATENT DOCUMENTS

| | | | | |
|---|---|---|---|---|
| 8,997,081 | B1* | 3/2015 | Manion | G06F 8/65 717/168 |
| 9,043,384 | B2* | 5/2015 | Subramanian | H04L 41/5083 709/203 |
| 9,483,577 | B2* | 11/2016 | Chen | G06F 17/30905 |
| 2002/0099739 | A1* | 7/2002 | Fischer | G06F 16/9577 715/239 |
| 2004/0103371 | A1* | 5/2004 | Chen | G06F 16/9577 715/205 |
| 2012/0290920 | A1* | 11/2012 | Crossley | G06F 11/3664 715/234 |
| 2014/0089786 | A1* | 3/2014 | Hashmi | G06F 17/2247 715/234 |
| 2015/0358790 | A1* | 12/2015 | Nasserbakht | H04W 4/16 455/414.1 |
| 2016/0147828 | A1* | 5/2016 | Yu | G06Q 40/123 705/31 |

* cited by examiner

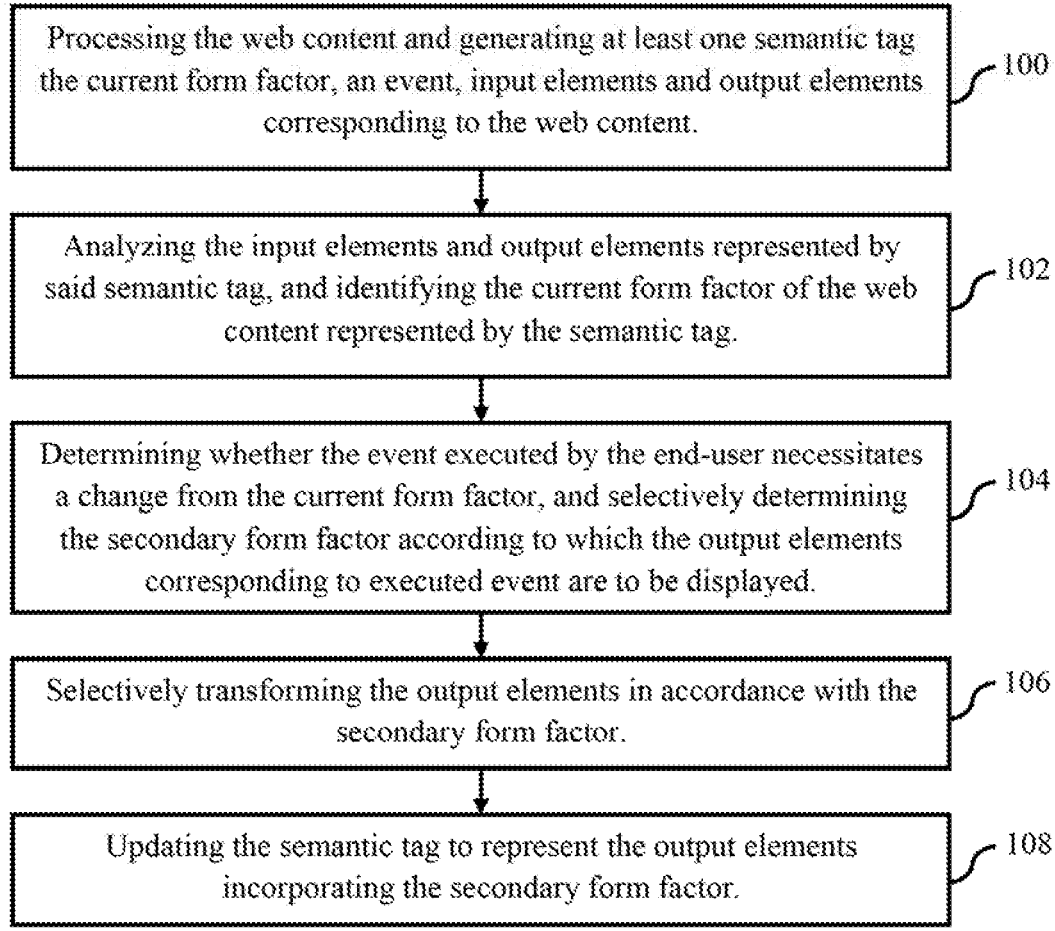

COMPUTER IMPLEMENTED SYSTEM AND METHOD FOR TRANSFORMING WEB CONTENT FOR DISPLAY ON MULTIPLE FORM FACTORS

CROSS-REFERENCE TO RELATED APPLICATION

The embodiments herein claim the priority of the U.S. Provisional Patent Application with Ser. No. 62/399488 filed on Sep. 26, 2016, with the title, "A COMPUTER IMPLEMENTED SYSTEM AND METHOD FOR OPTIMIZING DESKTOP WEB CONTENT FOR A MOBILE PLATFORM", and the contents of which is included entirely as reference herein.

TECHNICAL FIELD

The present disclosure relates to web-based engines that optimize web content for mobile platforms. Particularly, the present disclosure relates to web-based engines that optimize the web content for mobile platforms with minimal amount of manual coding. More particularly, the present disclosure relates to web-based engines that seamlessly transform web content from a primary form factor to a secondary form factor.

BACKGROUND

Creating a website typically requires a complete cycle of graphic design, HTML and Java script coding along with CSS styling. Further, the website thus created would also have to be extensively tested for any errors. Most of the works undertaken during the development of a web site are typically performed manually. Given the fact that most parts of the website are manually developed, the process of developing a website typically spans across at least a couple of months, and incurs reasonable expenditure in terms of costs, to the owner of the website.

Further, even in the case of developing a mobile optimized website, a cycle similar to the one mentioned is typically followed. In most of the cases, a mobile optimized website would be a replica of the original desktop website, represented albeit in a format applicable to mobile phones. In certain other cases, major portions of a desktop based website would have to be incorporated into a mobile platform.

With a substantial increase in the number of mobile phone users, and with a substantial improvement in the processing capabilities of mobile phones, mobile phones are being used more often than not, to access the internet, and also to access specific websites. Therefore, there has been felt a need to ensure that the information available to desktop users is also made available to users of mobile platforms.

Typically, since most of the mobile platform based websites are replicas of their desktop based counterparts, website owners typically ensure that the relevant portions of a desktop based website are seamlessly transferred onto its mobile platform based counterpart. Even though, both desktop application and mobile applications share the same content, transformation of a desktop application (website) into a mobile application is a cumbersome task that involves repeating the complete cycle of graphic design, HTML and Java script coding along with CSS styling. Such a phenomenon would not only result in duplication of work, but would also incur cost overheads to the website owner.

Therefore, there was felt a need for a computer implemented system and that would automate the process of optimization of desktop web content for a mobile platform.

OBJECTS

An object of the present disclosure is to provide a system incorporating built-in semantic tagging capabilities.

Another object of the present disclosure is to provide a system that auto generates test codes based on semantic tags.

Still a further object of the present disclosure is to provide a system that automatically discovers navigation elements or content through heuristic inference.

Yet another object of the present disclosure is to provide a system that is capable of personalizing a web page (particular web content) for different users.

Still a further object of the present disclosure is to provide a system that transforms a desktop based website into a mobile form factor with minimal quantum of software codes.

One more object of the present disclosure is to provide a system that provides data driven test cases by eliminating manual scripting of test cases, and by providing JSON (Java Script Object Notation) data as an input point for a test.

Yet another object of the present disclosure is to provide a system that enables users to extend their presence beyond desktop applications, and onto other channels such as native mobile applications.

SUMMARY

The present disclosure envisages a system that incorporates built-in semantic tagging capabilities. The system auto generates test codes based on semantic tags. The system automatically discovers navigation elements or content through heuristic inference. The system envisaged by the present disclosure is capable of personalizing a web page (particular web content) for different users. The system further transforms a desktop based website into a mobile form factor with minimal quantum of software codes. The system incorporates data driven test cases by eliminating manual scripting of test cases, and by providing JSON (Java Script Object Notation) data as an input point for a test. The system enables users to extend their presence beyond desktop applications, and onto other channels such as native mobile applications. The system envisaged by the present disclosure leverages the combination of semantic tagging and QA automation to ensure inter-alia that any web based content is seamlessly rendered onto a mobile platform based on the analyses of semantic tags, and in order to automatically generate test cases based on semantic tags.

BRIEF DESCRIPTION OF ACCOMPANYING DRAWINGS

The other objects, features and advantages will be apparent to those skilled in the art from the following description of the preferred embodiment and the accompanying drawings in which:

FIG. 1 is a flow chart illustrating the steps involved in the computer implemented method for transforming web content from a current form factor to a secondary form factor, in accordance with the present disclosure.

DETAILED DESCRIPTION

The present disclosure envisages a system that incorporates built-in semantic tagging capabilities. The system auto generates test cases based on semantic tags. The system envisaged by the present disclosure personalizes a web page (particular web content) for different users, based on the personalization criteria specified by each of the users. The system further transforms a desktop based website into a mobile form factor and vice-versa with minimal quantum of software programming. The system incorporates data driven test cases and eliminates manual scripting of test cases, by the way of providing JSON (Java Script Object Notation) data as an input point for a test. The system enables users to extend their presence beyond desktop applications, and onto other channels such as native mobile applications, by seamlessly transforming the web content from one form factor (current form factor) to another appropriate form factor (secondary form factor).

The present disclosure envisages a computer implemented system for transforming web content from a current form factor to a secondary form factor. The system, in accordance with the present disclosure includes a processor configured to transform any given desktop based website and the web content incorporated therein, into a secondary form factor, for example, a smart phone/tablet form factor.

The processor, in accordance with the present disclosure processes the web content displayed on the website and subsequently generates at least one semantic tag corresponding to the web content. The semantic tag thus generated stores information indicative of the current form factor of the website (an example of current form factor is 'desktop form factor'). Further, each semantic tag indicates an 'event' that could be executed upon the web content displayed on the web site. Further, the semantic tag also stores information corresponding to the 'input elements' related to the 'event', and 'output elements' that are to be generated as a result of execution of the 'event' (with the 'input elements' used as 'inputs' for the execution of the 'event').

In accordance with the present disclosure, the 'event' related information stored in the semantic tag includes information pertaining to firstly an 'event trigger' which is an element (on the webpage) that initiates the 'event'. Typical examples of event trigger include 'click of a SEARCH button', click of a 'DROP DOWN BUTTON'. Secondly, the semantic tag includes information pertaining to event inputs (also referred to as 'input elements') that provide inputs for the execution of the event. Thirdly, the semantic tag includes information pertaining to event outputs (also refereed to 'output elements') that are the resultants of the execution of the 'event'.

For example, consider a website incorporating a log-in screen. The semantic tag created for the log-in screen stores the information corresponding to the 'user log-in event', the 'input elements' i.e., the user name and password, the 'event trigger' which is submission of user name—password pair for authentication (preferably by the click of a SUBMIT button), the 'output elements' i.e., a welcome message and/or last log-in date.

In accordance with the present disclosure, the processor analyzes the semantic tags to identify elements and interactions from a desktop based web page which is required to be optimized for viewing on a mobile platform.

The semantic tags identify the events occurring on the web page in addition to identifying the corresponding 'input elements' and 'output elements'. In another example, the semantic tags are used to identify a SEARCH 'event' that occurred on an e-commerce website. The SEARCH 'event' triggered by the click of a SEARCH BUTTON (event trigger) is identified by the processor as being associated with a corresponding 'SEARCH TEXT' (input element) and a corresponding 'SEARCH RESULT' (output element). The semantic tag created by the processor in this case would incorporate information identifying the 'current form factor' of the e-commerce website (DESKTOP), 'event' (SEARCH, 'input elements' (SEARCH TEXT) and output elements (SEARCH RESULTS).

Subsequently, the processor analyses the semantic tag corresponding to the website/webpage, in addition to analyzing the Universal Resource Locators (URLs) directing to the location of the 'event' on the website/webpage. The semantic tags and the URLs directing to the location of the 'event' in combination form the 'context' of use of the webpage/website. The processor generates respective semantic tags for every event initiated by every user, and stores the semantic tags along with the corresponding URLs (directing to the event on the website/webpage) as the users' context (of interaction with the website/webpage).

In accordance with the present disclosure, a specific webpage is transformed from the current form factor (for example, desktop) to a secondary form factor (for example, a mobile form factor) by analysis of the semantic tag(s) corresponding to the webpage, and the event(s), trigger(s), input elements and output elements represented by the semantic tag(s). The processor envisaged by the present disclosure analyzes the semantic tag(s) corresponding to the webpage, and identifies the corresponding event(s) and the corresponding trigger(s), input elements and output elements represented by the semantic tag(s).

Further, when the processor identifies a need for transforming the form factor of the website/webpage—such a need identified based at least in part on the type of the device used by the user to access the webpage and the corresponding user context—the processor analyzes the semantic tag(s) corresponding to the webpage, and the corresponding event(s), input elements and, output elements, and subsequently modifies the output elements to suit the secondary form factor. Typically, the processor modifies the output elements to render the output suitable to the secondary form factor.

In accordance with the present disclosure, whenever an event (represented by the corresponding semantic tag) is initiated, a configuration file representing the event is created. The configuration file typically contains the possible inputs to the 'event', and the possible output of the event which is in turn governed by a predefined set of rules. The processor, typically modifies the rules governing the output, thereby modifying the configuration file corresponding to the 'event' to render the output of the 'event' suitable to the secondary form factor. In a typical example involving a transformation of a webpage from desktop form factor to mobile form factor, the processor, based on the semantic tag(s) corresponding to the 'event', identifies the corresponding event trigger, input elements and output elements, and subsequently modifies the output elements (by the way of modifying the configuration file as explained above) to suit the secondary form factor. In this example, preferably, extraneous elements in the desktop version are removed while the webpage is displayed on a mobile phone, and the navigation elements that do not fit within the display screen are also replaced with navigation elements that fit within the display screen of the mobile phone.

In accordance with the present disclosure, the processer processes the semantic tags corresponding to a webpage thereby processing all the 'events' corresponding to a webpage/website, and also all the 'input elements' and 'output elements' related to each of the 'events', to automatically generate a plurality of test cases. The test cases are subsequently executed by the processor to test the accuracy of the webpage/website inter-alia, and also to modify the rendering of the webpage/website based on the corresponding 'events', 'input elements', 'output elements' and data/information made available to the webpage/website. For example, the processor is configured to test for a broken (data) flow path. Broken paths are tested for, by providing a plurality of data/information variations for the data flow, and identifying a variation therefrom that would resolve the broken data flow path. The processor, in accordance with the present disclosure provides for a target webpage/website is continuously remodeled based on a user's varying needs. For example, a user belonging to a particular segment can be offered multiple different experiences, to identify which experience better suits the needs of the user, and also produces a better result (at least in terms of user experience) given a set of metrics for evaluation.

In accordance with the present disclosure, the processor In accordance with the present disclosure, the processer processes the semantic tags corresponding to a webpage thereby processing all the 'events' corresponding to a webpage/website, and also the 'event triggers', 'input elements' and 'output elements' related to each of the 'events', to automatically determine the context of use of the webpage/website. For an exemplary 'user log-in' event, the semantic tag denoting the 'event trigger', 'input elements' and 'output elements' is utilized to identify the 'context of use' in respect of the 'user log-in' event. In case of the 'user log-in event', the SUBMIT button is the 'trigger' for the 'event' while the data fields receiving the username-password pair are the 'input elements', and the last-login timestamp is the 'output element'.

The processor, in accordance with the present disclosure, the processor generates a contextual flow based on the analysis of the semantic tags that represent the 'event triggers', 'input elements' and 'output elements'. In case of an example of an online banking website, a user might follow the event of 'log-in' with 'view account' event followed by 'pay bill' event. Each of said events incorporate respective 'trigger', 'input elements' and 'output elements'. The processor envisaged by the present disclosure creates semantic tags representing each of the events in terms of 'event triggers', 'input elements', 'output elements' and 'current form factor', thereby simulating user's transactions and the corresponding context. Subsequently, the semantic tags codifying the simulated user actions are utilized to automatically generate a plurality of test cases.

In accordance with the present disclosure, the processor collects information corresponding to 'input elements', 'output elements' and 'events' occurring across the website/webpage, to identify the raw (performance) data. The processor analyzes the raw performance data to form a cohesive (web) page level performance metric, and to obtain an ability to identify and drill down to each individual event occurring across a webpage/website. The processor also envisages personalizing the webpage/website according to a personalization criterion set by a user of the webpage. In accordance with the present disclosure, the processor is configured to personalize either a whole page as per the personalization criteria set by the user, or selectively personalize the flows occurring in a webpage/website, based on a personalization criterion set by a user of the webpage.

In accordance with the present disclosure, the system envisages an analytic dashboard configured to display analytical data/information corresponding to a webpage/website. Further, the system is configured with auto scaling cloud installation to provide for replication of web instances. Further, the system utilizes an elastic cache, so as to ensure that the size of the cache can be modeled based on the changes to the scalability of the corresponding website. Further, the system makes use of scalable big data infrastructure to allow flexibility in terms of scalability of the corresponding website.

Referring to FIG. 1, there is shown a flowchart illustrating the steps involved in the computer implemented method for transforming web content from a current form factor to a secondary form factor. The method, in according with the present disclosure includes the following steps:

processing, by a processor, the web content displayed as a part of a website, and generating at least one semantic tag corresponding to the web content, said semantic tag indicating at least the current form factor of the web content, an event executed by an end-user on the web content, input elements provided by the end-user for execution of the event and output elements obtained as a result of execution of the event (100);

analyzing, by the processor, the input elements and output elements represented by said semantic tag, and identifying, by the processor, the current form factor of the web content represented by the semantic tag (102);

determining, by the processor, whether the event executed by the end-user necessitates a change from the current form factor, and selectively determining, by the processor, the secondary form factor according to which the output elements corresponding to executed event are to be displayed (104);

selectively transforming, by the processor, the output elements in accordance with the secondary form factor (106); and updating, by the processor, the semantic tag to represent the output elements incorporating the secondary form factor (108).

In accordance with the present disclosure, the method further includes the following steps:

segregating, by the processor, the events into predetermined categories based on corresponding input elements and output elements, and selectively identifying, by the processor, frequently occurring events based on analysis of the input elements and output elements represented by each of the semantic tags;

generating, by the processor, a plurality of test cases based on at least the semantic tags and the input elements and output elements corresponding thereto; and modifying, by the processor, each of the test cases by selectively incorporating therein, a set of display rules corresponding to at least one of the current form factor and secondary form factor.

In accordance with the present disclosure, the method further includes the step of analyzing, by the processor the semantic tag, and identifying from the semantic tag, the end-user's context of execution of the event, and characterizing the end-user's context based on an event trigger, the input elements corresponding to the event, and the output elements corresponding to the event.

The present disclosure envisages a non-transitory computer readable storage medium having computer readable instructions stored thereupon, the computer readable instructions when executed by a processor, cause the processor to:

process the web content displayed as a part of a website, and generate at least one semantic tag corresponding to the web content, said semantic tag indicating at least the current form factor of the web content, an event executed by an end-user on the web content, input elements provided by the end-user for execution of the event and output elements obtained as a result of execution of the event;

analyze the input elements and output elements represented by said semantic tag, and identify the current form factor of the web content represented by the semantic tag;

determine whether the event executed by the end-user necessitates a change from the current form factor, and selectively determine the secondary form factor according to which the output elements corresponding to executed event are to be displayed;

selectively transform the output elements in accordance with the secondary form factor; and update the semantic tag to represent the output elements incorporating the secondary form factor.

In accordance with the present disclosure, the computer readable instructions when executed by the processor, further cause the processor to:

segregate the events into predetermined categories based on corresponding input elements and output elements, and selectively identify frequently occurring events based on analysis of the input elements and output elements represented by each of the semantic tags;

generate a plurality of test cases based on at least the semantic tags and the input elements and output elements corresponding thereto;

modify each of the test cases by selectively incorporating therein, a set of display rules corresponding to at least one of the current form factor and secondary form factor.

In accordance with the present disclosure, the computer readable instructions when executed by the processor, further cause the processor to:

analyze the semantic tag, and identify from the semantic tag, the end-user's context of execution of the event, and characterize the end-user's context based on an event trigger, the input elements corresponding to the event, and the output elements corresponding to the event.

TECHNICAL ADVANTAGES

The technical advantages envisaged by the present disclosure include the realization of a system that incorporates built-in semantic tagging capabilities. The system auto generates test codes based on semantic tags. The system automatically discovers navigation elements or content through heuristic inference. The system envisaged by the present disclosure is capable of personalizing a webpage (particular web content) for different users. The system further transforms a desktop based website into a mobile form factor with minimal quantum of software codes. The system incorporates data driven test cases by eliminating manual scripting of test cases, and by providing JSON (Java Script Object Notation) data as an input point for a test. The system enables users to extend their presence beyond desktop applications, and onto other channels such as native mobile applications.

What is claimed is:

1. A computer implemented system for transforming web content from a current form factor to a secondary form factor, said system comprising:
   a processor configured to:
     process the web content displayed as a part of a website, and generate a plurality of semantic tags in response to events executed by an end-user on the web-content, said semantic tags respectively describing at least the current form factor of the web content, the events executed by the end-user on the web content, input elements provided by the end-user for execution of the events, output elements obtained as a result of execution of the events, and event triggers corresponding to the events executed by the end-user on the web content;
     determine a context of use of the website, based on an analysis of said semantic tags in combination with an analysis of the events, the input elements, the output elements, and the event triggers respectively represented by said semantic tags, further in combination with an analysis of Uniform Resource Locators (URLs) directing to respective locations of the events described by said semantic tags, on the website;
     trigger storage of said semantic tags and the URLs in a repository, wherein said semantic tags and the URLs in combination describe the context of use of the website;
     determine, based on the context of use of the website and form-factor of a device used by the end-user to access the website, whether an event executed by the end-user on the website necessitates a change of the website from the current form factor, and further determine the secondary form factor according to which at least the output elements corresponding to the event executed on the website are to be displayed;
     analyze said semantic tags corresponding to the event determined to be necessitating the change of the website from the current form factor, and identify, based on an analysis of said semantic tags corresponding to the event determined to be necessitating the change of the website from the current form factor to the second form factor, at least the input elements, event triggers, and output elements corresponding to the event;
     analyze a configuration file corresponding to the event necessitating the change of the website from the current form factor to the secondary form factor, and identify from the configuration file at least one pre-defined rule influencing a display of the output elements as a part of the website;
     selectively transform an identified pre-defined rule, such that the predefined rule triggers the display of the output elements as a part of the website and in accordance with the secondary form factor; and
     select, from said semantic tags corresponding to the event determined to be necessitating the change of the website from the current form factor to the secondary form factor, a semantic tag describing the output elements, and update the selected semantic tag to reflect a change from the current form factor to the secondary form factor.

2. The system as claimed in claim 1, wherein the processor is further configured to:
   segregate the events into predetermined categories based on corresponding input elements and output elements, and selectively identify frequently occurring events based on an analysis of said semantic tags describing the input elements and the output elements;
   generate a plurality of test cases based at least on said semantic tags describing the input elements and the output elements;

modify each of the test cases by selectively incorporating therein, a set of display rules corresponding to at least one of the current form factor and the secondary form factor.

3. A computer implemented method for transforming web content from a current form factor to a secondary form factor, said method comprising the following computer implemented steps:

processing, by a processor, the web content displayed as a part of a website, and generating a plurality of semantic tags in response to events executed by an end-user on the web-content, said semantic tags respectively describing at least the current form factor of the web content, the events executed by the end-user on the web content, input elements provided by the end-user for execution of the events, output elements obtained as a result of execution of the events, and event triggers corresponding to the events executed by the end-user on the web content;

determining, by the processor, a context of use of the website, based on an analysis of said semantic tags in combination with an analysis of the events, the input elements, the output elements, and the event triggers respectively represented by said semantic tags, further in combination with an analysis of Uniform Resource Locators (URLs) directing to respective locations of the events described by said semantic tags, on the website;

triggering, by the processor, storage of said semantic tags and the URLs in a repository, wherein said semantic tags and the URLs in combination describe the context of use of the website;

determining, by the processor, based on the context of use of the website and form factor of a device used by the end-user to accesses the website, whether an event executed by the end-user on the website necessitates a change of the website from the current form factor, and further determining, by the processor, the secondary form factor according to which at least the output elements corresponding to the event executed on the website are to be displayed;

analyzing, by the processor, said semantic tags corresponding to the event determined to be necessitating the change of the website from the current form factor, and identifying based on an analysis of said semantic tags corresponding to the event determined to be necessitating the change of the website from the current form factor, at least the input elements, event triggers, and output elements corresponding to the event;

analyzing, by the processor, a configuration file corresponding to the event determined to be necessitating the change of the website from the current form factor to the secondary form factor, and identifying from the configuration file at least one pre-defined rule influencing a display of the output elements as a part of the website;

selectively transforming, by the processor, an identified pre-defined rule, such that the pre-defined rule triggers the display of the output elements as a part of the website and in accordance with the secondary form factor; and selecting from said semantic tags corresponding to the event determined to be necessitating the change of the website from the current form factor to the secondary form factor, a semantic tag describing the output elements, and updating, by said processor, the selected semantic tag to reflect a change from the current form factor to the secondary form factor.

4. The method as claimed in claim 3, wherein the method further includes the following steps:

segregating, by the processor, the events into predetermined categories based on corresponding input elements and output elements, and selectively identifying, by the processor, frequently occurring events based on an analysis of said semantic tags describing the input elements and the output elements;

generating, by the processor, a plurality of test cases based at least on said semantic tags describing the input elements and output elements;

modifying, by the processor, each of the test cases by selectively incorporating therein, a set of display rules corresponding to at least one of the current form factor and the secondary form factor.

5. A non-transitory computer readable storage medium having computer readable instructions stored thereupon, the computer readable instructions when executed by a processor, cause the processor to:

process the web content displayed as a part of a website, and generate a plurality of semantic tags in response to events executed by an end-user on the web-content, said semantic tags respectively describing at least the current form factor of the web content, the events executed by the end-user on the web content, input elements provided by the end-user for execution of the events, output elements obtained as a result of execution of the events, and event triggers corresponding to the events executed by the end-user on the web content;

determine a context of use of the website, based on an analysis of said semantic tags in combination with an analysis of the events, the input elements, the output elements, and the event triggers respectively represented by said semantic tags, further in combination with an analysis of Uniform Resource Locators (URLs) directing to respective locations of the events represented by said semantic tags, on the website;

trigger storage of said semantic tags and the URLs in a repository, wherein said semantic tags and the URLs in combination describe the context of use of the website;

determine, based on the context of use of the website and form-factor of a device used by the end-user to access the website, whether an event executed by the end-user on the website necessitates a change of the website from the current form factor, and further determine the secondary form factor according to which at least the output elements corresponding to the event executed on the website are to be displayed;

analyze said semantic tags corresponding to the event determined to be necessitating the change of the website from the current form factor, and identity, based on an analysis of said semantic tags corresponding to the event determined to be necessitating the change of the website from the current form factor, at least the input elements, event triggers, and output elements corresponding to the event;

analyze a configuration file corresponding to the event necessitating the change of the website from the current form factor to the secondary form factor, and identify from the configuration file at least one pre-defined rule influencing a display of the output elements as a part of the website;

selectively transform an identified pre-defined rule, such that the pre-defined rule triggers the display of the output elements as a part of the website and in accordance with the secondary form factor; and select, from said semantic tags corresponding to the event determined to be necessitating the change of the website from the current form factor to the secondary form factor, a semantic tag describing the output elements, and update the selected semantic tag to reflect a change from the current form factor to the secondary form factor.

6. The non-transitory computer readable storage medium as claimed in claim 5, wherein the computer readable instructions when executed by the processor, further cause the processor to:
segregate the events into predetermined categories based on corresponding input elements and output elements, and selectively identify frequently occurring events based on an analysis of said semantic tags describing the input elements and the output elements;
generate a plurality of test cases based at least on said semantic tags describing the input elements and the output elements;
modify each of the test cases by selectively incorporating therein, a set of display rules corresponding to at least one of the current form factor and the secondary form factor.

* * * * *